June 27, 1967 G. E. BORGARD 3,327,813
AUTOMATIC ADJUSTING MECHANISM
Filed April 26, 1965 3 Sheets-Sheet 1

INVENTOR
GLENN E. BORGARD
BY
William R. O'Meara

June 27, 1967  G. E. BORGARD  3,327,813
AUTOMATIC ADJUSTING MECHANISM
Filed April 26, 1965  3 Sheets-Sheet 2

INVENTOR
GLENN E. BORGARD
BY William R. O'Meara

June 27, 1967 G. E. BORGARD 3,327,813
AUTOMATIC ADJUSTING MECHANISM
Filed April 26, 1965 3 Sheets-Sheet 3
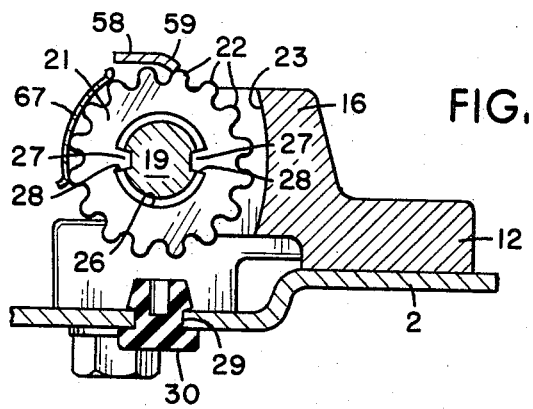
FIG. 4
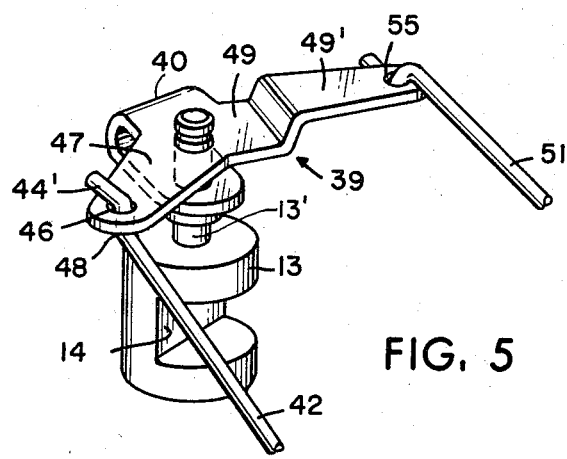
FIG. 5
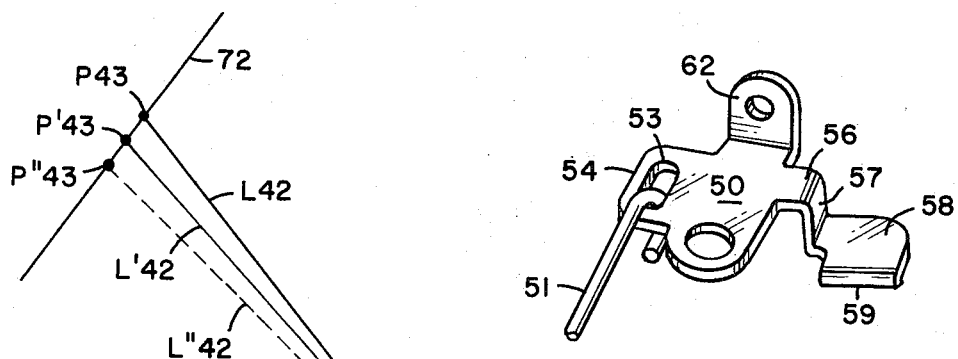
FIG. 7
FIG. 6
INVENTOR
GLENN E. BORGARD
BY
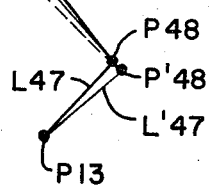

United States Patent Office 3,327,813
Patented June 27, 1967

3,327,813
AUTOMATIC ADJUSTING MECHANISM
Glenn E. Borgard, Sycamore Hills, Mo., assignor to Wagner Electric Corporation, St. Louis, Mo., a corporation of Delaware
Filed Apr. 26, 1965, Ser. No. 450,745
17 Claims. (Cl. 188—79.5)

ABSTRACT OF THE DISCLOSURE

A pivotal bell crank linked with a brake shoe and an adjusting lever and responsive to displacement movement of said brake shoe in excess of a predetermined amount to move said adjusting lever into driving engagement with an adjustable anchoring member for adjustably defining the retracted position of said brake shoe.

---

Figure 1:
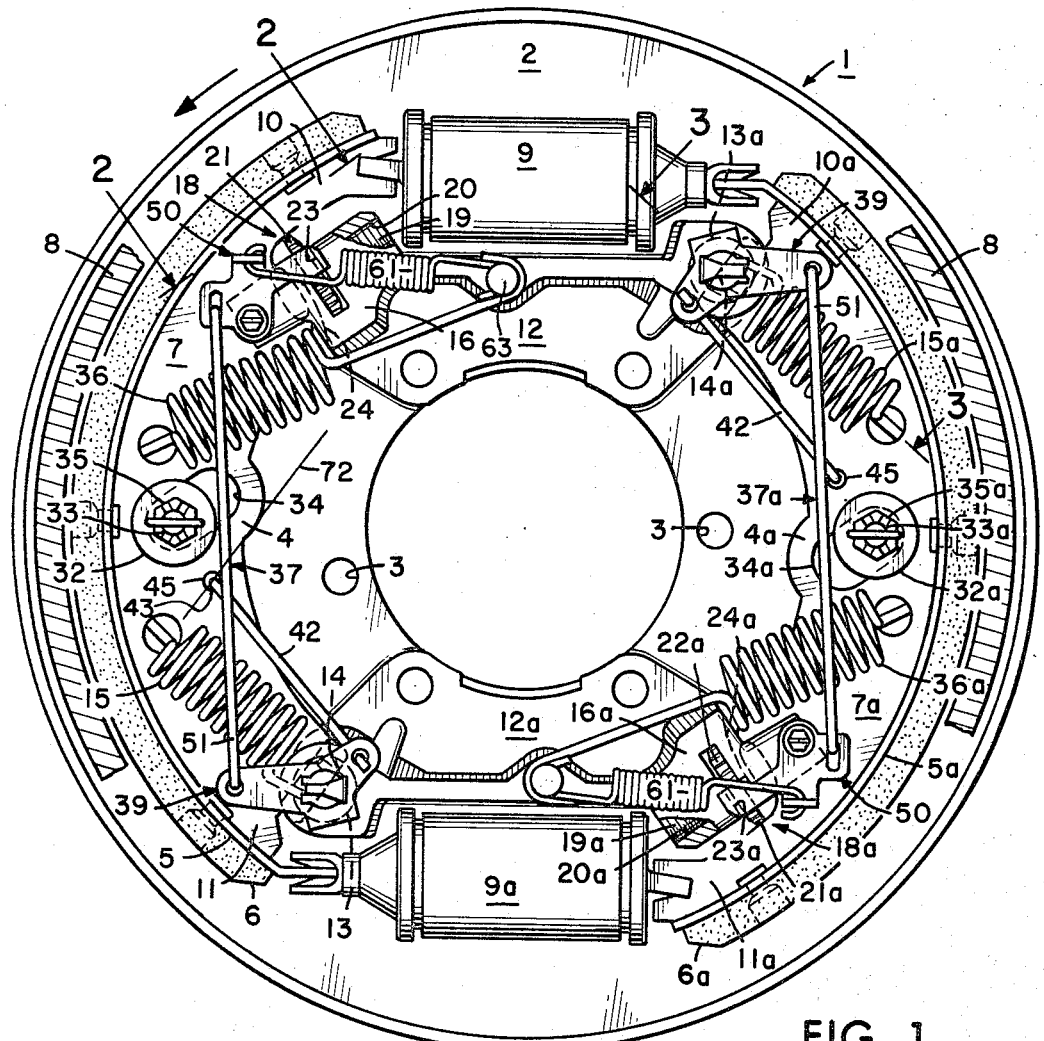

This invention relates to automatic adjusting mechanisms and more particularly to an automatic adjusting mechanism cooperable with a movable friction member of a friction device.

It is a general object of the present invention to provide a novel automatic adjusting mechanism for maintaining the displacement between a movable friction member and another member cooperable therewith substantially constant irrespective of friction member wear occasioned by frictional engagement between the friction members.

Another object of the present invention is to provide a novel automatic adjusting mechanism for automatically adjusting the retracted position of a movable friction member of a friction device relative to a cooperating friction element to maintain the displacement between the friction member element substantially constant irrespective of friction member wear and which mechanism is effective to maintain such displacement substantially constant over the effective life of the friction member.

Another object is to provide a novel automatic adjusting mechanism for a friction device of the type having a friction member frictionally engageable with a rotatable element of the device with one end of the friction member being a displaceable end when the rotatable element is rotating in one direction and an anchoring end when the rotatable element is rotating in the opposite direction wherein the mechanism is reliable in operation and relatively structurally simple and economical.

A further object is to provide an improved automatic adjusting mechanism for a brake of the type having a drum and a pair of brake shoes with friction material thereon wherein one end of each shoe is a displaceable end while the opposite end of each shoe is an anchoring end when the drum is rotating in one direction, and when the drum is rotating in the opposite direction the first named end of each shoe becomes the anchoring end and the opposite end thereof the displaceable end and wherein the relative positions of the parts of the mechanism are maintained substantially the same during the life of the friction material to provide efficient operation regardless of the wear condition of the lining.

Another object is to provide an improved automatic adjusting mechanism for a movable friction member of a vehicle brake which is simple in construction, reliable in operation and which is readily adapted for operation in response to excessive movement of the friction member when the vehicle is moving in the reverse direction.

These and other objects and advantages of the present invention will become apparent hereinafter.

Briefly, the present invention embodies adjusting means for a movable friction member of a friction device which includes adjustable anchor means for adjustably defining the retracted position of the friction member, movable adjusting means for adjusting the anchor means, lever means mounted for pivotal movement on the friction device, means connecting the lever means with the adjusting means for moving the adjusting means toward an operable position with respect to the anchor means, and means connected between the lever means and friction member for effecting pivotal movement of the lever means to move the adjusting means to the operable position in response to predetermined movement of the friction member, the adjusting means being subsequently movable to effect adjustment of the anchor means and to adjust the retracted position of the friction member.

Figure 1A:
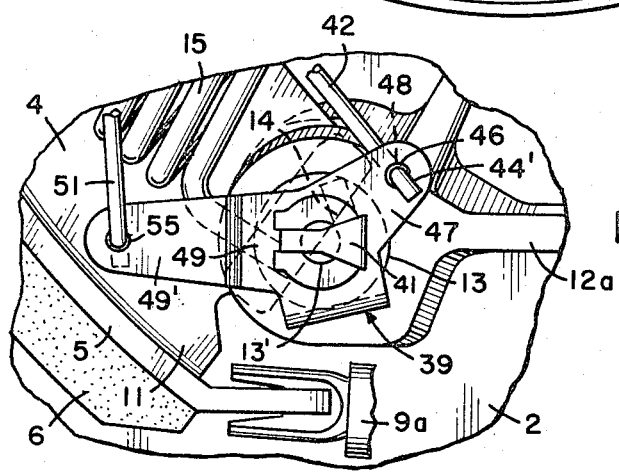
Figure 1B:
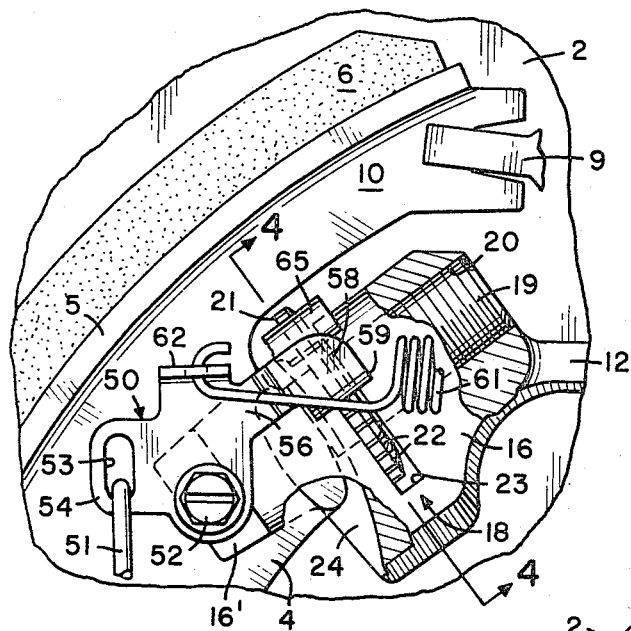
Figure 2:
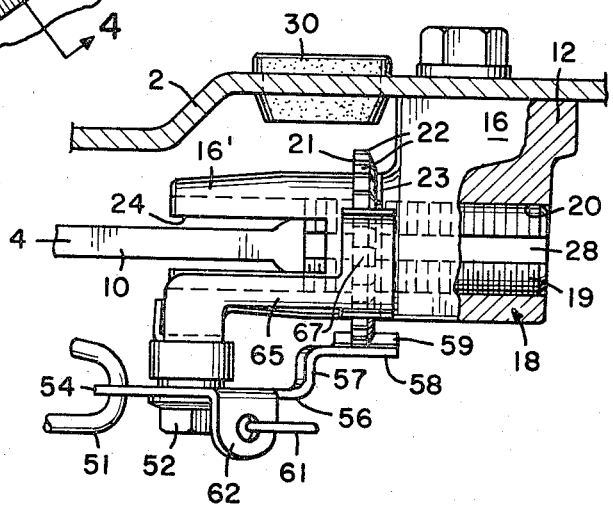
Figure 3:
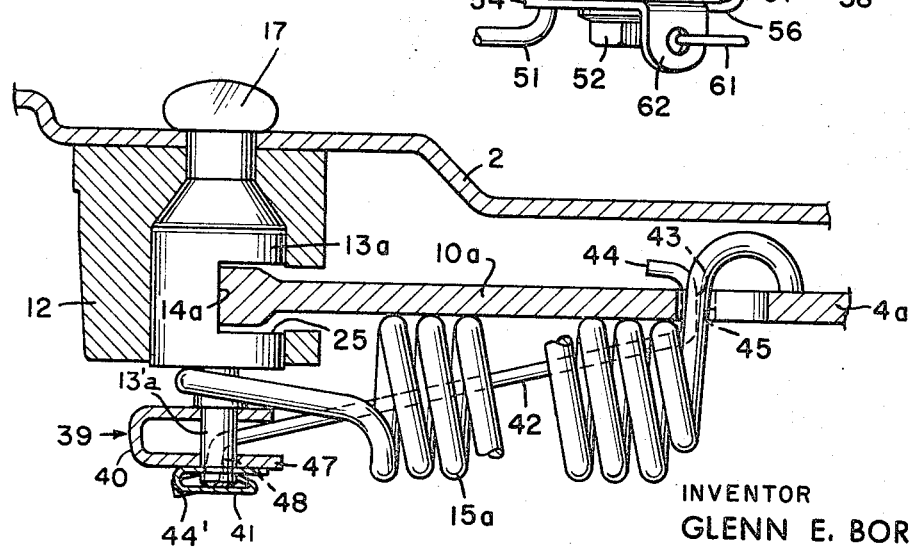

In the drawings which illustrate an embodiment of the invention,

FIG. 1 is an elevational view of a friction device embodying the present invention, FIGS. 1a and 1b are enlarged fragmentary views of FIG. 1, FIG. 2 is a sectional view taken along the line 2—2 of FIG. 1, FIG. 3 is a sectional view taken along the line 3—3 of FIG. 1, FIG. 4 is a sectional view taken along the line 4—4 of FIG. 1, FIG. 5 is a perspective view of certain parts including a lever of FIG. 1, FIG. 6 is a perspective view of another lever of FIG. 1, and FIG. 7 is a displacement diagram illustrating the changes in relative positions of certain elements of the device of FIG. 1 during the wear life of the shoe lining.

Referring now to the drawings, wherein like numerals refer to like parts, and to FIGS. 1–4 in particular, a friction device or wheel brake assembly 1 is shown provided with supporting means or a backing plate 2 having a plurality of centrally located mounting apertures 3 therein for connection with a vehicle axle flange (not shown). A pair of opposed radially displaceable friction members or brake shoes 4, 4a are mounted on backing plate 2 for movement relative thereto which have arcuate rim portions 5, 5a with friction material or linings 6, 6a secured thereto, such as by the well-known method of bonding or by rivets as shown, and web portions 7, 7a extending perpendicularly therefrom. The linings 6, 6a are adapted for frictional engagement with a relatively displaceable friction producing member or brake drum 8.

Actuator means shown as wheel cylinders 9, 9a are diametrically and oppositely secured, such as by studs (not shown), on the backing plate 2 and are operatively connected with adjacent ends 10, 10a and 11, 11a of the brake shoes 4, 4a. The cylinders 9, 9a are of conventional construction and each includes a pair of pistons. Diametrically and oppositely disposed stationary torque taking supports or anchor brackets 12, 12a are also secured to the backing plate 2 between adjacent brake shoe ends 10, 10a and 11, 11a by means of rivets (one shown at 17 in FIG. 3) and with the anchor brackets also adapted for fixed connection, along with the backing plate, to the non-rotatable vehicle axle flange. Rotatable anchor pins 13, 13a are provided with slots providing radially extending anchoring abutment surfaces 14, 14a for shoe ends 10a, 11. The anchor pins 13, 13a are pivotally mounted in the anchor brackets 12, 12a and return springs 15, 15a are connected between the brake shoes 4, 4a and anchor brackets 12, 12a or to anchor pin extensions 13', 13'a (FIGS. 1a and 3) to normally urge the brake shoe ends 11, 10a into respective anchoring engagement with the anchoring surfaces 14, 14a, the anchor pins 13 being pivotal with the brake shoes and the shoe ends 10a, 11 being slidable on these anchoring surfaces. Anchor brackets 12, 12a are also provided with integral portions or housings 16, 16a, and adjustable anchor means 18, 18a positioned in the anchor bracket housings 16, 16a, respectively, for adjusting the retracted positions of the brake shoes 4, 4a.

The adjustable anchor means 18, 18a include threaded adjusting screws 19, 19a threadedly received in threaded openings 20, 20a in the anchor bracket housings 16, 16a, respectively, and drive members or rotatable starwheels 21, 21a having serrated outer peripheral surfaces providing peripheral teeth 22, 22a, respectively. The starwheels 21, 21a are respectively disposed on the adjusting screws 19, 19a in cross-slots 23, 23a formed in the housings 16, 16a and which intersect the threaded openings 20, 20a. The bracket housings 16, 16a have extensions 16', 16'a provided with slots 24, 24a which respectively receive the shoe ends 10, 11a and which connect with the threaded openings 20, 20a so that in the retracted positions of shoes 4, 4a, the shoe ends 10, 11a respectively engage the ends of adjusting screws 19, 19a. The shoe end 10, as seen more clearly in FIG. 2, extends into slot 24 and engages the end of adjusting screw 19, while the opposite shoe end 11 is anchored against anchoring surface 14 of the anchor pin 13 when the shoe 4 is in the retracted position.

As seen in FIG. 4, starwheel 21 of adjustable anchor means 18 has an opening 26 through which adjusting screw 19 extends and also radially extending keys 27 which are received in keyways 28 in opposed sides of screw 19. The keys 27 effect rotation of the adjusting screw 19 when the starwheel 21 is rotated. The walls of cross-slot 23 limit or substantially prevent any axial movement of the starwheel 21, but opening 26 is of sufficient size relative to screw 19 to permit free axial movement of the screw relative to the starwheel 21 when the starwheel is turning screws 19. An opening 29 is provided in the backing plate 2 in alignment with the serrated periphery of the starwheel 21 to permit insertion of a tool if it is desired to manually rotate starwheel 21 and adjust the retracted position of the brake shoe 4. A removable plug 30 is disposed in the opening 29 to prevent foreign matter from passing through opening 29. The parts of adjustable anchor means 18a are similar to those of adjustable anchor means 18 and are therefore not shown in further detail.

The brake shoes 4, 4a are guided for lateral movement between the backing plate 2 and washers 32, 32a, respectively, the washers being respectively carried by studs 33, 33a secured to the backing plate 2 and which extend through oversized openings or slots 34, 34a. Nuts 35, 35a are respectively threadedly disposed on the ends of the studs 33, 33a to secure the washers 32, 32a and brake shoes 4, 4a against displacement from backing plate 2.

A pair of return springs 36, 36a are connected between the brake shoes 4, 4a and the anchor brackets 12, 12a, respectively, to normally urge the brake shoe ends 10, 11a into respective pivotal and sliding engagement with the adjustable anchor mechanisms 18, 18a. When the drum 7 is rotating in the forward direction, as indicated by the directional arrow, the brake shoe ends 10 and 11a are the unanchored or displaceable ends. However, when the drum 7 is rotating in the reverse direction opposite to the directional arrow, the anchoring and displaceable ends of the brake shoes are also reversed, that is, the brake shoe ends 10 and 11a become the anchor ends and brake shoe ends 10a and 11 become the displaceable ends. Return springs 36, 36a have a lower spring rate than return springs 15, 15a so that during forward brake applications when the displaceable or applied ends 10, 11a move out toward the drum, the opposite ends 10a, 11 remain in abutment with anchor pins 13, 13a to thereby avoid any initial displacement of the anchoring ends 10a, 11 and consequent slamming thereof against the anchor pins 13, 13a when torque is developed.

The adjustable anchor means 18, 18a, which are extendable to control the retracted positions of shoes 4, 4a, are automatically controlled by automatic adjustment mechanisms 37, 37a, respectively, to automatically maintain the displacement or running clearance between each of the brake shoes 4, 4a and the drum 8 substantially constant so as to compensate for wear of linings 6, 6a. The automatic adjustment mechanisms 37, 37a are identical in construction and operation except that mechanism 37 automatically adjusts the retracted position of shoe 4 to compensate for wear of lining 6 while mechanism 37a automatically adjusts the retracted position of shoe 4a to compensate for wear of lining 6a; thus, the description and operation of the mechanism 37 which follows will also hold true for the mechanism 37a.

The automatic adjustment mechanism 37 includes a lever 39, shown also in FIG. 5, pivotally mounted for rotation about a fixed axis intermediate the ends thereof. In the drawings, lever 39 is mounted for rotation on anchor pin extension 13' secured in the main body portion of anchor pin 13, the lever 39 being rotatable relative to extension 13'. The lever 39 is provided with an intermediate U-shaped portion 40 having aligned mounting holes which receive the anchor pin extension 13', the lever 39 being maintained in place by a snap ring 41 (FIG. 1a). A strut or link 42 is connected between a predetermined point on the brake shoe 4, which will be discussed at greater length hereinafter, and the lever 39, whereby movement of shoe 4 is translated into rotary movement of lever 39 about the axis of pin 13. The link 42 is pivotally connected to shoe 4 at a pivotal connection indicated at 43 formed by providing a depending end portion 44 thereon (FIG. 3) which extends through an opening 45 predeterminately located in the web 7 of shoe 4 and shown adjacent stud 33 between the center and end 11 of shoe 4. The opposite end portion of link 42, indicated at 44', is up-turned and extends through an opening 46 in a lever arm 47 of the lever 39 to provide a pivotal connection indicated at 48 between the link 42 and lever 39. The lever 39, as seen also in FIG. 5, is formed with another lever arm 49 having an end portion 49' which is in a plane offset from and above the plane of lever arm 47. The adjustment mechanism 37 also includes a driving member or adjusting lever 50, shown also in FIG. 6, which is pivotally mounted for rotation about a fixed axis on anchor bracket housing 16 for engaging and rotating the starwheel 21 and which is operatively connected to lever 39 by means of a strut or link 51. The adjusting lever 50 is mounted for rotary movement intermediate the opposite ends thereof on a stud or pin 52 (FIG. 1b) secured in bracket housing extension 16'. The opposite ends of link 51 are bent downwardly with one of the ends extending into an opening or slot 53 in an extension or arm 54 of the adjusting lever 50 and with the other end extending into an opening 55 in lever arm 49 of the lever 39 so that the link 51 is pivotally connected to each of the levers 39 and 50. The lever 50 has another extension or driving arm 56, shown also in FIG. 6, which has a downwardly extending portion 57 interconnecting a pawl or driving detent portion 58 which is in a plane offset from the plane of arm 54 and which has a depending tooth-engaging detent 59. The adjusting lever 50 is biased in a clockwise direction (FIG. 1) toward engagement with a tooth 22 on starwheel 21 by a tensioned adjustor spring 61 connected between an upstanding flange 62 of the lever 50 and a pin 63 secured to the anchor bracket 12. There is also provided a resilient member 65 (FIGS. 1b, 2 and 4) secured to stud 52 having an arcuate end portion 67 which resiliently engages a plurality of teeth 22 on the periphery of starwheel 21 to apply a force thereto for preventing any unwarranted rotation of the starwheel.

In describing the operation of the automatic adjustment mechanism 37, it will be assumed the friction lining 6 has worn in excess of a predetermined amount and thus requires an adjustment of the retracted position of shoe 4 in order to compensate for such wear, and that the drum is rotating in a clockwise direction opposite the directional arrow, that is, in a direction corresponding to movement of the vehicle in the reverse direction. When the wheel cylinders 9, 9a are energized, such as by transmitting fluid pressure thereto from a source of fluid pressure, for example, a master cylinder or the like (not shown), actuating forces are established which effect displacement movement of brake shoes 4, 4a into frictional engagement with drum 8 to thereby effect energization of the brake 1. During the above-mentioned displacement of shoe 4, the shoe end 11 is the displaceable end and shoe end 10 anchors against the adjusting screw 19. Since the displacement movement of shoe end 11 is in excess of the predetermined amount because of the excess wear of lining 6, the link 42 rotates lever 39 in a counterclockwise direction, as viewed in FIG. 1, whereby link 51 is moved longitudinally downwardly effecting counterclockwise rotation of adjusting lever 50 against the force of spring 61. This movement of lever 50 causes the detent 59 to slip over a tooth 22 or engage a successive tooth 22 on starwheel 21 to thereby "set" or index the adjusting mechanism 37 so that the adjusting lever 50 is in an operable position. If now the brake 1 is de-energized, such as by exhausting the fluid pressure in the wheel cylinders 9, 9a, the shoe return spring 15 effects retractile or return movement of shoe 4. As fluid pressure is exhausted, the links 42 and 51, and lever 39 return to the original positions they had before the above brake application, but the force of shoe return spring 36 is effective to maintain the shoe end 10 urged against the adjusting screw 19 and normally with sufficient force to prevent rotation thereof by the lever 50. Thus, the adjusting mechanism 37 normally remains in its operable position with the detent 59 engaging the hereinbefore mentioned successive tooth 22 upon release of the brake. The slot 53 in lever 50 provides lost motion between link 51 and lever 50 and permits the lever 50 to remain in its operable position relative to the adjustable anchor means 18 while link 51 and lever 39 are returned to their original positions by link 42.

If now the brake 1 is again energized such that the actuating force on shoe end 10 overcomes the force of shoe return spring 36 or end 10 is displaced from screw 19, such as on a brake application during forward movement of the vehicle, adjustor spring 61 becomes effective to rotate adjustor lever 50 in a clockwise direction; that is, it returns lever 50 to its original position, such as the position shown in FIG. 1. During this return movement of lever 50, detent 59 drivingly engages the above-mentioned successive tooth 22 and rotates the starwheel 21 and adjusting screw 19, the force of spring 61 being sufficient to overcome the friction between resilient member 65 and the starwheel 21. This rotation of the starwheel 21 causes screw 19 to move axially toward the drum and effects adjustment of the retracted position of shoe 4 in a direction to reduce the running clearance between the drum 8 and shoe 4 to thereby compensate for the wear of lining 6.

Whenever the shoe displacement or running clearance between the lining 6 and drum 8 is within the designed permissible limits, the movement of link 42 will be insufficient to move adjusting lever 50 to an operable position. Also, with the embodiment shown in FIG. 1, the application or energization of brake 1 during forward movement of the vehicle (rotation of drum 8 in direction of arrow in FIG. 1) will not effect operation of mechanism 37 and adjustment of the retracted position of shoe 4 whether or not the running clearance between the lining 6 and drum 8 is in excess of the predetermined amount. This is because shoe end 11, during forward brake applications, remains anchored against anchor pin 13 and the link 42 moves substantially about its pivotal connection with lever 39 so that link 42 cannot move sufficiently to cause actuation of the levers 39 and 50. Thus, with the arrangement illustrated in FIG. 1, the mechanism 37 is not "set" or moved to an operable position on forward brake applications, and overadjustment as a result of thermal expansion or distortion of the drum, which is more predominant during forward brake applications, is avoided.

During the wear life of lining 6, the shoe 4 is automatically adjusted toward the drum 8 by the adjustment mechanism 37 to maintain the clearance or displacement movement of the shoe substantially constant or within predetermined permissible limits. The retracted position of shoe 4 over the life of lining 6 changes such that a given point on shoe 4, such as the pivotal connection 43, will substantially lie at a different point on an imaginary line, indicated at 72, each time the shoe 4 is in a new retracted position. Since the shoe 4 engages the anchoring surface 14 in each retracted position thereof, the imaginary line 72 is substantially parallel to the plane of surface 14. Even though the pivotal connection 43 between link 42 and the shoe 4 changes, the parts of the automatic adjustment mechanism 37, particularly levers 39 and 50, and link 51, are constructed and arranged with respect to each other and the parts of brake 1, such that the relative positions thereof remain substantially the same over the wear life of lining 6 so that the operating characteristics of the mechanism 37 remain substantially the same regardless of the wear condition of lining 6. This is accomplished by suitably locating the pivotal connection 43 relative to level 39 such that lever 39 remains substantially in the same position in each new retracted position of shoe 4 throughout the wear life of lining 6. By arranging the lever 39 and link 42 such that the angle between the longitudinal axis of lever arm 47 and the longitudinal axis of link 42 is substantially 90°, the relative positions of the levers 39 and 50, and link 51 will remain substantially the same for each retracted position of shoe 4 over the life of lining 6. If the above-mentioned angle between the longitudinal axes of lever arm 47 and link 42 is greater by a predetermined amount than 90° when the lining is new, and is less than 90° by said predetermined amount when the lining is worn to a maximum or to a condition in which it must be replaced, the change in relative positions between the levers 39 and 50 and link 51 over the life of lining 6 can be made to be a minimum. This will be readily understood by referring to the diagram shown in FIG. 7 wherein the changes in the relative positions of the indicated parts of the adjusting mechanism are exagerated for clarity. In FIG. 7, the line segment L42 represents the position of link 42, and points P43 and P48 represent the pivotal connections 43 and 48 of link 42 with the shoe web 7 and lever 39, respectively, when the lining 6 is new and shoe 4 is in its retracted position. Line segment L47 represents the arm 47 of lever 39, and point P13 the axis of anchor pin 13 about which the lever 39 rotates. Over the wear life of lining 6, the pivotal connection 43 follows line 72 and moves from its original position at point P43 through a point P′43, which represents the position of pivotal connection 43 when the lining 6 is worn 50% of its wear life and shoe 4 is retracted, to a point P″43, which represents the position of pivotal connection 43 when the lining 6 is fully worn or worn 100% of its useful wear life and with shoe 4 retracted.

As shown in FIG. 7, the angle between the line segment L47 and the line segment L42 (new lining) is slightly greater than 90°. When the lining is worn 50%, the angle between line segments L′47 (displaced position of lever arm 47) and L′42 is 90°, and when the lining 6 is fully worn, the angle between L47 and L″42 is less than 90°. By arranging the lever 39 and link 42 in this manner, as the pivotal connection 43 changes position from point P43 to point P′43, the position of lever arm 47 is changed by link 42 only slightly and in a direction away from the center of shoe 4 or in a clockwise direction from its original position (L47) to the displaced position (L′47). As the lining 6 wears from its 50% wear condition to its fully worn condition, the link 42 moves from position L′42 to a position L″42 and the lever arm 47 is returned or moved in a counterclockwise direction from its displaced position L′47 back to its original position L47. In this way, the maximum change in position of the lever 39 is very little over the useful life of lining 6 so that the operating characteristics of mechanism 37 remain substantially the same.

It is now apparent that novel automatic adjustment means meeting the objects set out hereinbefore are provided and that changes and modifications in the disclosure may be made by those skilled in the art without departing from the spirit and scope of the invention, as defined by the claims which follow.

The embodiments of the invention in which an exclusive property or privilege is claimed are defined as follows:

1. In a friction device having a pair of relatively displaceable friction members, one of said friction members being movable between a retracted position and a displaced position in frictional engagement with the other of said friction members, adjustable anchor means for said one friction member supported on said friction device and extendable to adjust the retracted position of said one friction member, adjusting means rotatably mounted on said friction device for drivingly engaging and extending said anchor means, lever means spaced from said adjusting means and rotatably mounted on a fixed portion of said friction device, means connecting said adjusting means for movement with said lever means, and means pivotally connected with said friction member and said lever means to effect rotation of said lever means and move said adjusting means in one direction to an operable position with respect to said anchor means in response to predetermined movement of said one friction member, said adjusting means being thereafter movable in another direction to extend said anchor means and adjust the retracted position of said one friction member.

2. In a friction device having a pair of relatively displaceable friction members for energization into frictional engagement, extendable anchor means for one of said friction members supported on said friction device for adjusting the retracted position of said one friction member, adjusting means on said friction device for drivingly engaging and extending said anchor means, lever means spaced from said adjusting means and rotatably mounted on a fixed portion of said friction device, pivotal connection means drivingly connecting said lever means with said adjusting means for moving said adjusting means in one direction toward an operable position with respect to said anchor means in response to pivotal movement of said lever means, and means pivotally connected between said one friction member and said lever means to effect pivotal movement of said lever means and move said adjusting means to said operable position in response to movement of said one friction member in excess of a predetermined amount, said adjusting means being movable in the opposite direction to extend said anchor means and adjust the retracted position of said one friction member.

3. In a friction device having a movable friction member, a coacting member, and means for energizing said friction device including actuating means for moving said friction member from a retracted position to a displaced position in frictional engagement with said coacting member, extendable anchor means movably supported on said friction device and engageable with said friction member to adjustably define the retracted position of said friction member, resiliently urged drive means rotatable about a fixed axis on said friction member and drivingly engageable with said anchor means for extending said anchor means, lever means rotatably mounted on a fixed portion of said friction device, link means connected at the opposite ends thereof to said drive means and said lever means to move said drive means in one direction toward an operable position with respect to said anchor means in response to pivotal movement of said lever means, and other link means pivotally connected at the opposite ends thereof to said friction member and said lever means to effect pivotal movement of said lever means and position said drive means in said operable position in response to displacement movement of said friction member in excess of a predetermined amount, said drive means being movable in the opposite direction from said operable position to effect adjustment of said anchor means and the retracted position of said friction member.

4. In a friction device having a friction member for displacement and retractile movement between a retracted position and a displaced position in frictional engagement with a coacting member, adjustable anchoring means movably supported on said friction device and normally engaged with said friction member to define the retracted position thereof, said adjustable anchoring means being rotatably driven relative to said friction member to adjust the retracted position thereof, resiliently urged means supported on said friction device for driving engagement with said adjustable anchoring means, lever means rotatably mounted on a fixed portion of said friction device, means responsive to pivotal movement of said lever means for moving said resiliently urged means in one direction toward a position in driving engagement with said adjustable anchoring means, motion translating means pivotally connected with said friction member and said lever means for translating displacement movement of said friction member into pivotal movement of said lever means, and means normally urging said friction member toward the retracted position thereof into engagement with said adjustable anchoring means and having a force great enough to normally prevent driven adjustable rotation thereof by said resiliently urged means, said resiliently urged means being movable in another direction opposite to the one direction to rotatably drive said adjustable anchoring means and adjust the retracted position of said friction member upon displacement movement thereof.

5. In a friction device, a movable friction member having opposed displaceable ends, a coacting member, resilient means normally urging said friction member toward a retracted position, means for energizing said friction device including actuating means for moving said friction member from the retracted position to a displaced position in frictional engagement with said coacting member, extendable anchor means rotatably supported on said friction device and engageable with said friction member to adjustably define the retracted position thereof, resiliently urged drive means rotatably mounted on said friction device and drivingly engageable with said anchor means for rotating and extending said anchor means, lever means rotatably mounted about a fixed portion of said friction device, link means pivotally connected at the opposite ends thereof respectively to said drive means and said lever means to effect pivotal movement of said drive means against the resiliency thereof toward an operable position in driving engagement with said anchor means in response to pivotal movement of said lever means, and other link means pivotally connected at one end thereof to said friction member at a point thereon intermediate said opposed ends of said first named link means and pivotally connected at the opposite end thereof to said lever means to translate displacement movement of one of said friction member ends in excess of a predetermined amount into pivotal movement of said lever means to move said drive means into said operable position, said drive means being thereafter pivotal in the opposite direction to drivingly rotate said anchor means and adjust the retracted position of said friction member.

6. In a friction device, a friction member having opposed displaceable ends and movable between a retracted position and a displaced position in frictional engagement with a coacting member, anchor abutment means engageable with one of said opposed friction member ends, adjustable anchoring means rotatably supported on said friction device and normally engaged with the other of said friction member ends for adjustably defining the retracted position of said friction member, said anchoring means being rotatably driven relative to said friction member to adjust the retracted position thereof, resiliently urged means supported on said friction device for rotatably driving said anchoring means, lever means rotatably mounted on a fixed portion of said friction device and spaced from said resiliently urged means, means responsive to pivotal movement of said lever means in a first direction for moving said resiliently urged means in one direction toward an operable position in driving engagement with said anchoring means and providing lost motion between said lever means and resiliently urged means for pivotal movement of said lever means in a second direction opposite said first direction, motion translating means pivotally connected with said one friction member and said lever means respectively for translating displacement movement of said one friction member end in excess of a predetermined amount into pivotal movement of said lever means in said first direction to move said resiliently urged means into said operable position, and spring means normally urging said other friction member end into engagement with said anchoring means and having a force great enough to normally prevent driven rotation of said anchoring means by said resiliently urged means, said resiliently urged means being thereafter movable in another direction opposite said one direction to rotatably drive said anchoring means and adjust the retracted position of said friction member.

7. In a friction device, a friction member having opposed displaceable ends and movable between a retracted position and a displaced position in frictional engagement with a coacting member, anchor abutment means on said friction device engageable with one of said opposed friction member ends, adjustable anchor means rotatably supported on said friction device and engageable with the other of said opposed friction member ends to adjustably define the retracted position of said friction member, resiliently urged drive means drivingly engageable with said anchor means for adjusting said anchor means, lever means pivotally mounted on a fixed portion of said friction device, link means pivotally connected between said drive means and said lever means to effect movement of said drive means in one direction toward an operable position in driving engagement with said anchor means in response to pivotal movement of said lever means, and other link means pivotally connected with said friction member and said lever means respectively to translate displacement movement of said one friction member end in excess of a predetermined amount into pivotal movement of said lever means to move said drive means to said operable position, said drive means being movable thereafter in the opposite direction from said operable position to drivingly rotate said anchor means and adjust the retracted position of said friction member.

8. In a friction device, a friction member having opposed displaceable ends, a coacting member, means for energizing said friction device including actuating means for moving said friction member from a retracted position to a displaced position in frictional engagement with said coacting member, anchor abutment means normally engaged with one of said opposed friction member ends, stationary support means adjacent the other of said opposed friction member ends, adjustable anchor means rotatably supported by said support means and normally engaged with the other of said opposed friction member ends to adjustably define the retracted position of said friction member, resiliently urged drive means mounted for rotation about a fixed axis on said friction device and drivingly engageable with said anchor means for rotating and adjusting said anchor means, lever means mounted adjacent to said one opposed friction member end for rotation about another fixed axis on said friction device, link means pivotally connected between said drive means and said lever means to effect movement of said drive means in one direction toward an operable position in driving engagement wtih said anchor means in response to pivotal movement of said lever means, and other link means pivotally connected between said friction member and said lever means to translate displacement movement of said one friction member end in excess of a predetermined amount into pivotal movement of said lever means to position said drive means in said operable position, said drive means being movable in the opposite direction from said operable position to rotate said anchor means and adjust the retracted position of said friction member.

9. In a friction device, a friction member having opposed displaceable ends, a coacting member, means for energizing said friction device including actuating means for moving said friction member from a retracted position to a displaced position in frictional engagement with said coacting member, anchor abutment means normally engaged by one of said opposed friction member ends, stationary support means adjacent the other of said opposed friction member ends, adjustable anchor means rotatably supported by said support means and normally engaged with the other of said opposed friction member ends to adjustably define the retracted position of said friction member, resiliently urged drive means rotatably mounted on said support means and drivingly engageable with said anchor means for rotatably adjusting said anchor means, lever means mounted adjacent to said one opposed friction member end for rotation about a fixed axis on said friction device, link means pivotally connected at the opposite ends thereof respectively to said drive means and said lever means to effect movement of said drive means in one direction toward an operable position in driving engagement with said anchor means in response to pivotal movement of said lever means, and other link means pivotally connected at one end thereof to said friction member at a point intermediate said opposed ends and at the opposite end thereof to said lever means to translate displacement movement of said one friction member end in excess of a predetermined amount into pivotal movement of said lever means to move said drive means into said operable position, said drive means being subsequently movable in the opposite direction to adjust said anchor means and the retracted position of said friction member.

10. In a friction device, a friction member having opposed displaceable ends, a coacting member, means for energizing said friction device including actuating means for moving said friction member from a retracted position to a displaced position in frictional engagement with said coacting member, anchor abutment means normally engaged with one of said opposed friction member ends, stationary support means adjacent the other of said opposed friction member ends, adjustable anchoring means including a threaded member threadedly mounted in said support means and normally engaged with said other friction member end to define the retracted position of said friction member, and a rotatable drive member on said threaded member adapted to drivingly rotate said threaded member to move said threaded member axially relative thereto for adjusting the retracted position of said friction member, said drive member having a serrated surface, resiliently urged pawl means rotatably mounted on said support means and drivingly engageable with said serrated surface for rotating said drive member, lever means mounted for rotation about a fixed axis on said friction device adjacent to said one opposed friction member end, link means pivotally connected between said pawl means and said lever means to effect movement of said pawl means in one direction toward an operable position in driving engagement with said serrated surface in response to pivotal movement of said lever means, and other link means pivotally connected between said friction member and said lever means to translate displacement movement of said one friction member end in excess of a predetermined amount into pivotal movement of said lever means to move said pawl means into said operable position, said pawl means being thereafter movable in the opposite direction to rotate said drive member and said threaded member to adjust the retracted position of said friction member.

11. In a friction device, a rotatable friction element, a friction member having opposed displaceable ends and movable from a retracted position to a displaced position in frictional engagement with said friction element, anchor abutment means normally engaged by one of said opposed friction member ends, stationary support means adjacent the other of said opposed friction member ends, adjustable anchoring means including threaded means threadedly mounted in said support means and normally engaged with said other opposed friction member end to define the retracted position of said friction member, and a rotatable drive member on said threaded means adapted to drivingly rotate said threaded means to move said threaded means axially relative to said support means and said drive member for adjusting the retracted position of said friction member, first spring means for normally urging said one friction member end against said anchor abutment means, second spring means normally urging said other friction member end against said threaded means, means for energizing said friction device including first actuating means for displacing said one friction member end from said anchor abutment means against the force of said first spring means, and second actuating means for displacing said other friction member end from said threaded means against the force of said second spring means, pawl means rotatably mounted on said support means and drivingly engageable with said drive member for adjustably rotating said threaded means, resilient means connected between said pawl means and a stationary part of said friction device to urge said pawl means in one direction, lever means mounted adjacent to said one opposed friction member end for rotation about a fixed axis on said friction device, link means pivotally connected at the opposite ends thereof respectively with said drive means and said lever means to effect movement of said pawl means in a direction opposite said one direction toward an operable position in driving engagement with said drive member in response to pivotal movement of said lever means, and other link means pivotally connected at one end thereof to said friction member at a point intermediate said opposed friction member ends and at the opposite end thereof to said lever means to translate displacement movement of said one friction member end in excess of a predetermined amount into pivotal movement of said lever means to move said pawl means in said opposite direction into said operable position, said pawl means being subsequently movable in said one direction by said resilient means to drivingly rotate said drive member and adjust the retracted position of said friction member.

12. In a vehicle brake, a friction member having opposing ends, a rotatable coacting member, adjustable anchoring means rotatably supported on said friction device and normally engaged with one of said opposed friction member ends to define the retracted position of said friction member, anchor abutment means normally engaged with the other of said opposed friction member ends, said adjustable anchoring means being rotatably driven relative to said friction member to adjust the retracted position thereof, first spring means for normally urging said one friction member end against said adjustable anchoring means, second spring means normally urging said other friction member end against said anchor abutment means, means for energizing said friction device including first actuating means for displacing said one friction member end from said adjustable anchoring means against the force of said first spring means, and second actuating means for displacing said other friction member end from said anchor abutment means against the force of said second spring means, resiliently urged drive means rotatable about a fixed axis on said friction device and drivingly engageable with said adjustable anchoring means for rotating said adjustable anchoring means to adjust the retracted position of said friction member, lever means rotatable about another fixed axis on said friction member and spaced from said drive means, first link means having one end thereof pivotally connected to said drive means and the opposite end thereof pivotally connected to said lever means to effect rotation of said drive means in one direction against the resilient force thereof toward an operable position in driving engagement with said adjustable anchoring means in response to pivotal movement of said lever means in a first direction, and second link means having one end pivotally connected to said friction member between said opposed friction member ends and the opposite end thereof pivotally connected to said lever means to translate displacement movement of said other friction member end in excess of a predetermined amount into pivotal movement of said lever means in said first direction upon energization of said friction device when said coacting member is rotating in a direction corresponding to reverse vehicle movement to rotate said drive means into said operable position, the force of said first spring means acting on said one friction member end being great enough to normally prevent driving rotation of said adjustable anchoring means by said drive means during de-energization of said friction device, said drive means being rotatable in another direction opposite said one direction to rotate said adjustable anchoring means and adjust the retracted position of said friction member in response to the application of a force on said one friction member end by said first actuating means sufficient to overcome the force of said first spring means.

13. In a brake assembly, a drum, an arcuate brake shoe having wearable friction material thereon and opposed displaceable ends, said brake shoe being movable between a retracted position and a displaced position with said friction material in frictional engagement with said drum, anchor abutment means on said brake assembly having a substantially radial abutment surface engaged by one of said opposed brake shoe ends when said brake shoe is in a retracted position, adjustable anchoring means rotatably mounted on said brake assembly and engaged with the other of said opposed brake shoe ends when said brake shoe is in a retracted position, said anchoring means being extendable when rotated to adjust the retracted position of said brake shoe, adjusting means rotatably mounted for rotation about a fixed axis on said brake assembly and drivingly engageable with said anchoring means for adjustably rotating and extending said anchoring means, resilient means connected between said adjusting means and a stationary part of said brake assembly to urge said adjusting means in a first direction, lever means mounted for rotation about a second fixed axis on said brake assembly adjacent to said one brake shoe end, first link means pivotally connected adjacent the opposite ends thereof respectively to said adjustment means and said lever means to effect movement of said adjusting means in a second direction opposite said first direction toward a cocked position with respect to said anchoring means in response to pivotal movement of said lever means, and second link means having one end thereof pivotally connected to said brake shoe at a point thereon between the arcuate center of said brake shoe and said one brake shoe end and with the opposite end of said second link means being pivotally connected to said lever means to translate displacement movement of said one brake shoe end in excess of a predetermined amount into pivotal movement of said lever means to move said adjusting means to said cocked position, said adjusting means being subsequently movable in the opposite direction from said cocked position by the force of said resilient means to adjust the retracted position of said brake shoe.

14. In a friction device, a friction member having opposed displaceable ends and movable between a retracted position and a displaced position in frictional engagement with a coacting member, anchor abutment means on said friction device normally engaged with one of said opposed friction member ends, adjustable anchoring means rotatably mounted on said friction device and engageable with the other of said opposed friction member ends, said anchoring means being extendable when rotated to adjust the retracted position of said friction member, resiliently urged drive means rotatably mounted for rotation about a first fixed axis on said friction device and drivingly engageable with said anchoring means for adjustably rotating and extending said anchoring means, lever means mounted for rotation about a second fixed axis on a fixed portion of said friction device, first link means pivotally connected between said drive means and said lever means to effect movement of said drive means in one direction toward an operable position in driving engagement with said anchoring means in response to pivotal movement of said lever means, and second link means having one end thereof connected to said friction member at a predetermined point thereon and the opposite end thereof connected to said lever means at a selected point thereon to translate displacement movement of said one friction member end in excess of a predetermined amount into pivotal movement of said lever means to move said drive means to said operable position, said drive means being thereafter movable in the opposite direction from said operable position to drivingly rotate said anchoring means and adjust the retracted position of said friction member, the angle between a first imaginary line intersecting said predetermined and selected points and a second imaginary line intersecting said second axis and said selected point being approximately 90° when said friction member is in a retracted position.

15. In a friction device, a friction member having wearable friction material thereon and opposed displaceable ends, said friction member being movable between a retracted position and a displaced position with said friction material in frictional engagement with a coacting member, anchor abutment means on said friction device normally engaged with one of said opposed friction member ends, adjustable anchoring means rotatably mounted on said friction device and engageable with the other of said opposed friction member ends, said anchoring means being extendable when rotated to adjust the retracted position of said friction member, resiliently urged drive means rotatably mounted for rotation about a first fixed axis on said friction device and drivingly engageable with said anchoring means for adjustably rotating and extending said anchoring means, lever means mounted for rotation about a second fixed axis on a fixed portion of said friction device, first link means pivotally connected between said drive means and said lever means to effect movement of said drive means in one direction toward an operable position in driving engagement with said anchoring means in response to pivotal movement of said lever means, and second link means having one end thereof connected to said friction member at a predetermined point thereon and the opposite end thereof connected to said lever means at a selected point thereon to translate displacement movement of said one friction member end in excess of a predetermined amount into pivotal movement of said lever means to move said drive means to said operable position, said drive means being subsequently movable in the opposite direction from said operable position to drivingly rotate said anchoring means and adjust the retracted position of said friction member, the angle between a first imaginary line intersecting said predetermined and selected points and a second imaginary line intersecting said second axis and said selected point being greater than 90° when said friction material is of maximum thickness and said friction member is in a retracted position, and less than 90° when said friction material is of minimum thickness due to wear and said friction member is in a retracted position.

16. In a vehicle brake, a rotatable brake drum, a brake shoe having opposed displaceable ends, means for energizing said vehicle brake to move said shoe from a retracted position to a displaced position in frictional engagement with said drum including first actuating means for applying a force on one of said brake shoe ends to effect displacement movement thereof, and second actuating means for applying a force on the other of said brake shoe ends to effect displacement movement thereof, first and second torque taking means respectively adjacent to said one and other brake shoe ends, said first torque taking means including anchor abutment means normally engaged by said one brake shoe end, adjustable anchor means including a threaded member threadedly received in said second torque taking means and normally engaged by said other brake shoe end to define the retracted position of said friction member, and a rotatable serrated member on said threaded member adapted to drivingly rotate and move said threaded member axially relative to said second torque taking means and said serrated member for adjusting the retracted position of said brake shoe, first return spring means normally urging said one brake shoe end against said anchor abutment means, second return spring means normally urging said other brake shoe end against said threaded member, first lever means mounted for rotation on said second torque taking means and having a pawl portion for driving engagement with said serrated member, resilient means connected to said first lever to bias said lever in one direction, second lever means mounted for rotation about a fixed axis on said first torque taking means, first link means having one end thereof pivotally connected to said first lever means and the opposite end thereof pivotally connected with said second lever means to effect rotation of said first lever means in another direction opposite said one direction toward a cocked position with said pawl portion in driving engagement with said serrated member in response to pivotal movement of said second lever means, and second link means having one end pivotally connected to said brake shoe at a point intermediate said opposed ends thereof and the opposite end thereof pivotally connected to said second lever means to translate displacement movement of said one brake shoe end in excess of a predetermined amount upon energization of said brake during rotation of said drum in a direction corresponding to vehicle movement in the reverse direction into pivotal movement of said second lever means to move said first lever means into said cocked position, said first lever means being thereafter movable from said cocked position by the force of said resilient means so that said pawl portion rotatably drives said serrated and threaded members and adjusts the retracted position of said brake shoe.

17. In a vehicle brake, a rotatable brake drum, a brake shoe having a brake lining and opposed displaceable ends, means for energizing said brake to move said shoe from a retracted position to a displaced position wherein said lining frictionally engages said drum including first actuating means for applying a force on one of said brake shoe ends to effect displacement movement thereof, and second actuating means for applying a force on the other of said brake shoe ends to effect displacement movement thereof, first and second torque taking means respectively adjacent to said one end other brake shoe ends, said first torque taking means including anchor abutment means normally engaged by said one brake shoe end, said second torque taking means having a threaded opening therein and a slot intersecting said threaded opening, adjustable anchor means including a screw member threadedly received in said threaded opening and normally engaged with said other brake shoe end to define the retracted position of said friction member, and a rotatable wheel member having a serrated periphery and disposed in said slot on said threaded member and adapted to drivingly rotate and move said threaded member axially relative to said wheel member and said second torque taking member for adjusting the retracted position of said brake shoe, first return spring means normally urging said one brake shoe end against said anchor abutment means, second return spring means normally urging said other brake shoe end against said threaded member, first lever means mounted for rotation intermediate the opposite ends thereof on said second torque taking means and having a pawl portion at one of said opposite ends thereof for driving engagement with said serrated periphery, resilient means connected between said first lever means and a stationary part of said friction device to normally urge said first lever means in one direction, second lever means mounted for rotation intermediate the opposite ends thereof about a fixed axis on said first torque taking means, first link means having one end pivotally connected to said first lever means adjacent to the other of said opposite ends thereof, the opposite end of said first link means being pivotally connected to said second lever means adjacent one of said opposite ends thereof to effect rotation of said first lever means in a direction opposite said one direction toward a cocked position in which said pawl portion is in driving engagement with said serrated periphery in response to pivotal movement of said second lever means, and second link means having one end pivotally connected to said brake shoe at a point intermediate said opposed ends thereof and the opposite end thereof pivotally connected to said second lever means adjacent the other of said opposite ends thereof to translate displacement movement of said one brake shoe end in excess of a predetermined amount upon energization of said brake during rotation of said drum in a direction corresponding to vehicle movement in the reverse direction into pivotal movement of said second lever means to move said first lever means into said cocked position, the force of said first spring means acting on said other brake shoe end being great enough to normally prevent driven rotation of said wheel and screw members by said pawl portion during de-energization of said brake, said first lever means being released from said cocked position to permit said pawl portion to be rotatably driven by said resilient means to rotate said screw member and adjust the retracted position of said brake shoe in response to subsequent displacement movement of said other brake shoe end by said second actuating means.

References Cited
UNITED STATES PATENTS

| | | | |
|---|---|---|---|
| 2,066,077 | 12/1936 | Sanford et al. | 188—79.5 |
| 2,938,610 | 5/1960 | Dombeck et al. | 188—79.5 |
| 3,074,514 | 1/1963 | Mossey et al. | 188—79.5 |
| 3,128,848 | 4/1964 | Swift | 188—79.5 |

DUANE A. REGER, *Primary Examiner.*